(12) United States Patent
Nagai

(10) Patent No.: US 7,677,773 B2
(45) Date of Patent: Mar. 16, 2010

(54) VEHICLE ROOM LAMP

(75) Inventor: Kentaro Nagai, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/601,823

(22) Filed: Nov. 20, 2006

(65) Prior Publication Data

US 2007/0139944 A1   Jun. 21, 2007

(30) Foreign Application Priority Data

Dec. 20, 2005   (JP)   ............... P2005-365982

(51) Int. Cl.
*B60Q 1/00* (2006.01)

(52) U.S. Cl. ............... 362/488; 362/295; 362/490

(58) Field of Classification Search ............... 362/154, 362/155, 277, 282, 295, 319, 322, 362, 394, 362/488, 490, 512

See application file for complete search history.

(56) References Cited

U.S. PATENT DOCUMENTS 2,500,007 A * 3/1950 Polevitzky ............... 362/295
2,673,914 A * 3/1954 Sundt ............... 362/394
6,799,875 B2   10/2004 Flokstra et al.

FOREIGN PATENT DOCUMENTS

| GB | 2332043 A | 6/1999 |
| JP | 03236102 A * | 10/1991 |
| JP | 2002-316579 A | 10/2002 |

* cited by examiner

*Primary Examiner*—Y My Quach Lee
(74) *Attorney, Agent, or Firm*—Sughrue Mion, PLLC

(57) ABSTRACT

A vehicle room lamp includes a box-like body, a light source received within the box-like body, a switch provided within the box-like body so as to control the turning-on and -off of the light source, a light-transmitting portion which is provided at the box-like body at an opening thereof so as to move toward and away from the switch, and allows light from the light source to pass therethrough to the exterior of the box-like body, and an abutment member which is movable together with the light-transmitting portion, and can operate the switch in accordance with the movement of the light-transmitting portion toward the switch. The abutment member is disposed outside a light distribution range of light directed from the light source toward the light-transmitting portion.

8 Claims, 5 Drawing Sheets

VEHICLE ROOM LAMP

BACKGROUND OF THE INVENTION

1. Field of the Invention

This invention relates to a vehicle room lamp which is provided within a vehicle room (or compartment), and is switched between the ON-state (for illuminating the room) and the OFF-state by pressing a light-transmitting member such as a lens.

2. Related Art

An automobile is equipped with a vehicle room lamp (or interior lamp) so as to ensure that the passenger can comfortably get in and out of the automobile at night. For example in a passenger car, such a vehicle room lamp is usually mounted at a central portion of a ceiling of the passenger room (or compartment), and the whole of the passenger room is uniformly illuminated by light distributed by this lamp. The vehicle room lamp is so disposed that a switch can be operated both from a front seat side and a rear seat side. Generally, the switch can be located in any one of three positions, that is, an ON position, an OFF position and a DOOR ACTUATED position.

JP-A-2002-316579 Publication discloses a technical concept in which a push switch is turned on and off by a lens plate (which transmits light from a bulb therethrough in a spreading manner) such that the lens plate is used instead of a knob for operating the switch so as to turn on and off the bulb. With this construction, a box-like body can be formed into a compact size, and besides a vehicle room lamp with a novel design can be produced.

However, in such a conventional vehicle room lamp with the box-like body of a compact design as disclosed in Patent Literature 1 and others, a projection formed on a reverse surface of the lens plate is held against the push switch, and when the user presses the lens plate, the projection presses the push switch to switch the same so as to turn on and off the bulb. Therefore, light from the bulb is intercepted by this projection, and besides the thickness of the light-transmitting lens plate is increased because of the provision of the projection. Therefore, a shadow of the projection, etc., are formed on a design surface of the lens plate at the reverse side of the projection relative to the bulb, so that light and dark portions are formed on the illumination surface (i.e., the design surface) of the lens plate, and therefore it has been difficult for the illumination surface to become luminous uniformly over the entire area thereof.

It may be proposed to provide the switch and the projection at the outside of the lens plate. In this case, however, the box-like body, etc., of the vehicle room lamp increase in size, and this is not desirable because of a limited space available within the vehicle and for other reasons.

SUMMARY OF THE INVENTION

With the above problems in view, it is an object of this invention to provide a vehicle room lamp in which an illumination surface can become luminous uniformly over an entire area thereof.

On aspect of the above object has been achieved by a vehicle room lamp of the invention comprising a box-like body, a light source received within the box-like body, a switch provided within the box-like body so as to control the turning-on and -off of the light source, a light-transmitting portion which is provided at the box-like body at an opening thereof so as to move toward and away from the switch, and allows light from the light source to pass therethrough to the exterior of the box-like body, and an abutment member which is movable together with the light-transmitting portion, and can operate the switch in accordance with the movement of the light-transmitting portion toward the switch; characterized in that the abutment member is disposed outside a light distribution range of light directed from the light source toward the light-transmitting portion.

In the vehicle room lamp of the invention, the abutment member is disposed outside the light distribution range of light directed from the light source toward the light-transmitting portion, and therefore the abutment member is prevented from intercepting light which is to pass through the light-transmitting portion. The light distribution range means the distribution range of those of light rays from the light source which pass through the light-transmitting portion.

A vehicle room lamp of another aspect of the invention, is further characterized in that the light-transmitting portion has an upstanding portion projecting in an upstanding manner generally toward the switch; and the abutment member is formed integrally on the upstanding portion.

In the vehicle room lamp of such aspect of the invention, the abutment member is formed integrally on the upstanding portion projecting in an upstanding manner from the light-transmitting portion, and therefore the abutment member is positively prevented from intercepting light which is to pass through the light-transmitting portion.

A vehicle room lamp of another aspect of the invention, is further characterized in that the light-transmitting portion has an upstanding portion projecting in an upstanding manner generally toward the switch; and the abutment member is separate from the upstanding portion, and is attached to the upstanding portion.

In the vehicle room lamp of such aspect of the invention, the abutment member separate from the upstanding portion is attached to the upstanding portion projecting in an upstanding manner from the light-transmitting portion, and therefore the abutment member is positively disposed outside the light distribution range, and light in the light distribution range can be positively passed through the light-transmitting portion.

As described above, in the vehicle room lamp of the invention, the abutment member is prevented from intercepting light which is to pass through the light-transmitting portion, and therefore a shadow of the abutment member is prevented from appearing on the light-transmitting portion, and therefore an illumination surface of the light-transmitting portion can become luminous uniformly over an entire area thereof. Therefore, there can be provided the vehicle room lamp in which the box-like body can be formed into a compact design without degrading the appearance, and a novel design of the room lamp can be achieved. And besides, the abutment member can be provided on the reverse side of the light-transmitting portion, which contributes to a thin design of the light-transmitting portion, and also the degree of freedom of disposition of the switch can be increased.

In the invention, the abutment member is formed integrally on the upstanding portion formed in an upstanding manner on the light-transmitting portion, and the abutment member is positively prevented from intercepting light which is to pass through the light-transmitting portion. Therefore, in addition of the advantage of the invention of claim 1, the number of the component parts can be reduced.

In the invention, the abutment member separate from the light-transmitting portion can be positively disposed outside the light distribution range, and light in the light distribution range can be positively passed through the light-transmitting portion. Therefore, in addition to the advantage of the first aspect of the invention, a material (such as an engineering plastics material, metal or others) which is not restricted by the light-transmitting portion can be used for forming the abutment member, and therefore the degree of freedom for the strength, design, etc., can be enhanced.

DETAILED DESCRIPTION OF THE PREFERRED EMBODIMENTS

One preferred embodiment of a vehicle room lamp of the present invention will now be described with reference to FIGS. 1 to 6.

Figure 1:
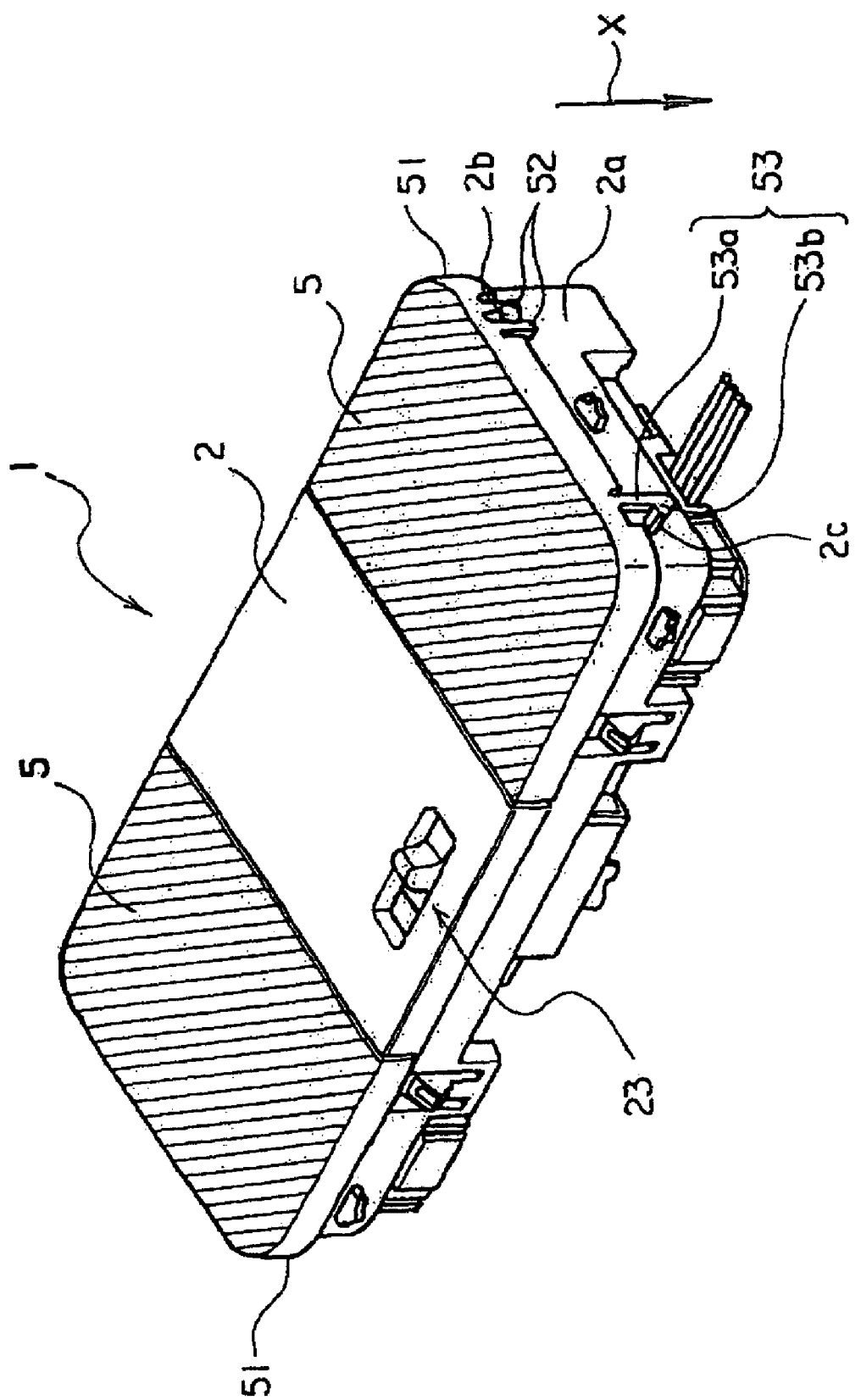
FIG. 1 is a perspective view of a vehicle room lamp of the present invention, showing its appearance.
Figure 2:
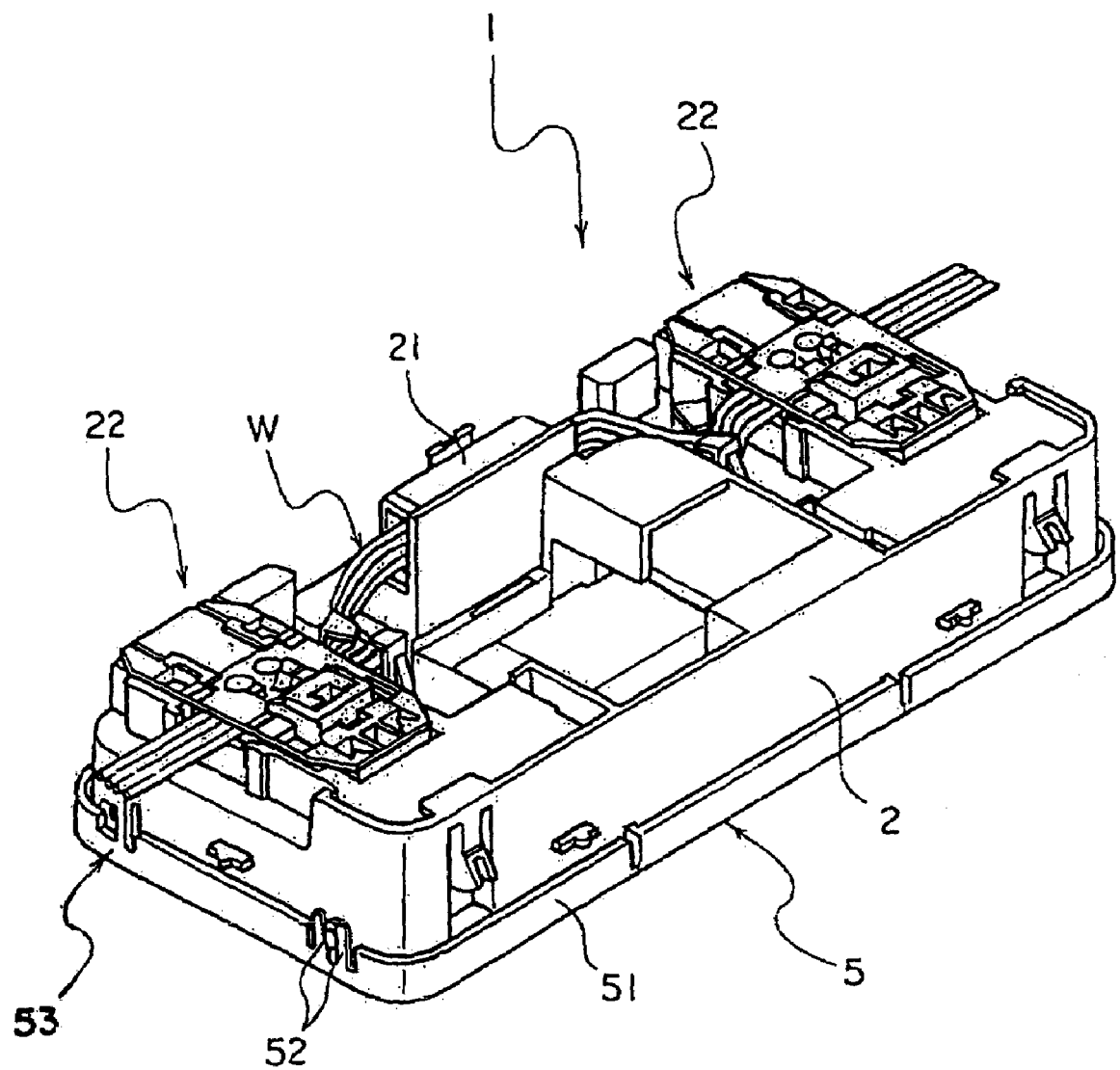
FIG. 2 is a perspective view showing a reverse side of the vehicle room lamp of FIG. 1.
Figure 3:
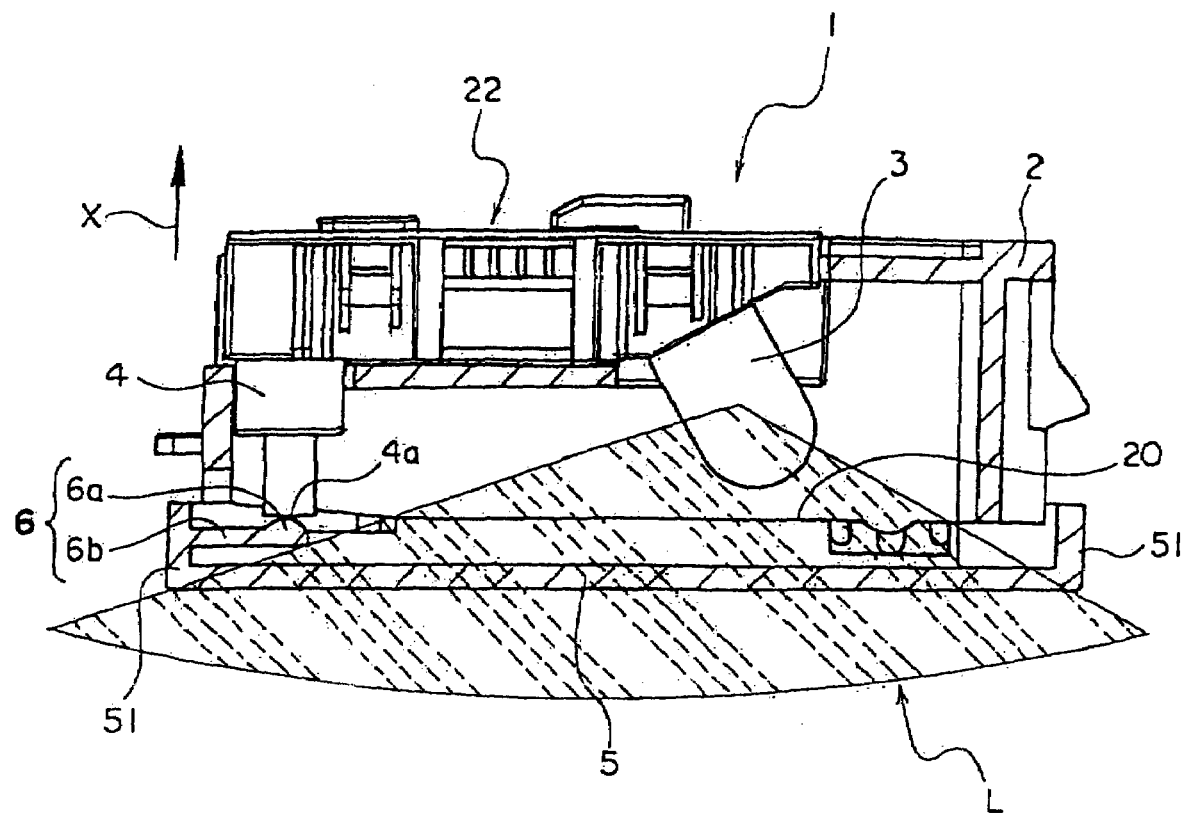
FIG. 3 is a cross-sectional view explanatory of an abutment member of the vehicle room lamp of the invention.

In FIGS. 1 to 3, the vehicle room lamp 1 comprises a box-like body 2, bulbs 3 serving as light sources, push switches 4, light-transmitting portions 5, and abutment members 6. For example, in a passenger car, the vehicle room lamp 1 is usually mounted at a central portion of a ceiling of a passenger room (i.e., a vehicle room) so as to illuminate the whole of the passenger room uniformly.

The box-like body 2 is made of a synthetic resin or the like, and has a fixing portion for fixing to the ceiling of the vehicle room. The box-like body 2 has a mode changeover switch 21 provided at its central portion in its longitudinal direction. Two switch units 22 and 22 are provided respectively at opposite sides of the mode changeover switch 21, and are connected to wires W as shown in FIG. 2. Bus bars (not shown) within the mode changeover switch 21 are electrically connected to an onboard battery, door switches (which can be turned on and off in response to the opening and closing of doors), an earth, etc. The mode changeover switch 21 has a switch operating portion 23 which can be operated both from a rear seat side and a front seat side to switch this mode changeover switch 21 between an OFF state and a DOOR ACTUATED mode.

The box-like body 2 has two openings 20 and 20 disposed bilaterally symmetrically with respect to a central plane of the box-like body 2 in the longitudinal direction. The bulbs 3 are disposed inwardly of the two openings 20 and 20, respectively, and light emitted from each bulb 3 passes through the corresponding opening 20. The two openings 20 and 20 are closed by the light-transmitting portions 5 and 5 (described later), respectively. An engagement portion 2b and a retaining portion 2c are formed at each of opposite end walls (spaced from each other in the longitudinal direction) of the box-like body 2. The engagement portion 2b has a generally cylindrical shape, and is gripped by gripping portions 52 of the light-transmitting portion 5 (described later) in such a manner that this engagement portion 2b can angularly move, and also can move in a pressing direction X. The retaining portion 2c is urged by urging means (not shown) provided between the push switches 4 within the box-like body 2, and in this urging condition, this retaining portion 2c is retainingly engaged with a retaining convex portion 53 (described later) of the light-transmitting portion 5.

As shown in FIG. 3, each bulb 3 is provided at the corresponding switch unit 21 such that light emitted from this bulb 3 is directed toward the corresponding light-transmitting portion 5. Thus, the bulbs 3 are received within the box-like body 2. Each bulb 3 is turned on upon supply of electric power from the corresponding switch unit 22. In this embodiment, although the bulbs 3 are used as the light sources, any other suitable light source means such as a light-emitting diode or a lamp can be used.

The push switches 4 are provided within the box-like body so as to control the turning-on and -off of the respective bulbs 3. Each push switch 4 is mounted on a lighting circuit (not shown) of the switch unit 22 in such a manner that a distal end of the push switch 4 is disposed generally at the opening 20. Also, the push switch 4 is received in the box-like body 2 in such a manner that the distal end of this push switch 4 is disposed outside a light distribution range L (described later). When the push switch 4 is pressed to be switched into the ON state, electric current from the onboard battery flows to the earth via the switch unit 22 and the bulb 3, so that the bulb 3 is turned on (or lighted).

Each of the light-transmitting portions 5 is made of a light-transmitting synthetic resin or the like capable of passing light from the bulb 3 therethrough to the exterior of the box-like body 2, the light-transmitting portion 5 being formed into a thin flat plate-shape. In this embodiment, a diffusing agent is added to the material for forming the light-transmitting portion 5, so that the light-transmitting portion 5 is designed to pass light therethrough in a diffusing manner. However, the light-transmitting portion 5 can be formed by a panel, a lens, etc., of low light transmissivity.

The light-transmitting portion 5 is slightly larger in size than the opening 20 in the box-like body 2 so as to close the opening 20. A front surface of the light-transmitting portion 5 (that is, its surface which is viewed by the user) serves as an indication design surface, and light from the bulb 3 transmits through this surface, so that this surface is viewed as being luminous. The light-transmitting portion 5 has an upstanding portion 51 projecting upright generally in a direction toward the bulb 3. The upstanding portion 51 is formed on and projects upright from an edge of a flat plate portion of the light-transmitting portion 5, and covers an edge portion of the box-like body 2 defining the opening 20.

The upstanding portion 51 has the pair of gripping portions 52 and 52 gripping the engagement portion 2b in a manner to allow the angular movement of this engagement portion 2b, and the retaining convex portion 53 retainingly engaged with the retaining portion 2c. The pair of grip portions 52 and 52 grip the engagement portion 2b such that when that portion of the front surface of the light-transmitting portion 5 remote from the push switch 4 is pressed in the pressing direction X (see FIGS. 1 and 3), the engagement portion 2 can be moved in the pressing direction X within a predetermined range. When this pressing operation is finished, the engagement portion 2b is returned to a predetermined position by the above urging means.

The retaining convex portion 53 includes an arm 53a extending from the upstanding portion 51 in the pressing direction X, and a convex portion 53b which convexly projects from a distal end of the arm 53a toward the retaining portion 2c to be retainingly engaged with this retaining portion 2c. Normally, the convex portion 53b is urged in a direction opposite to the pressing direction X by the urging means, and is kept retainingly engaged with the retaining portion 2c. When that portion of the light-transmitting portion 5 in the vicinity of the push switch 4 is pressed in the pressing direction X, the retaining engagement between the convex portion 53b and the retaining portion 2c is canceled against the bias of the urging means, and the light-transmitting portion 5 can be moved in the pressing direction X. Namely, the retaining convex portion 53 limits the movement of the light-transmitting portion 5 in the direction opposite to the pressing direction X, and with this construction the light-transmitting portion 5 can be moved toward and away from the push switch 4.

Figure 4:
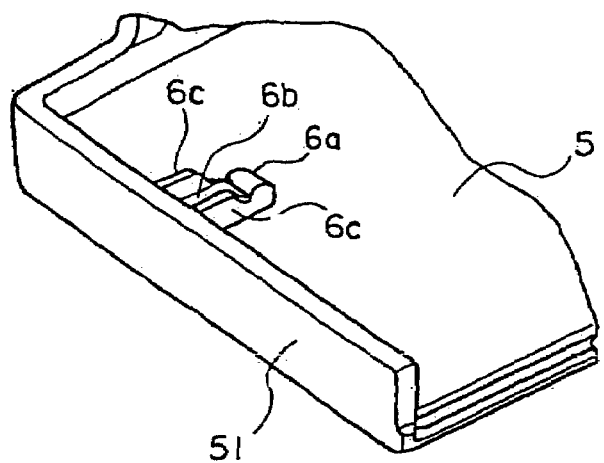
FIG. 4 is a view explanatory of the relation between a light-transmitting portion and the abutment member.

As shown in FIGS. 3 and 4, the abutment member 6 is integrally formed on and projects from an inner surface of the upstanding portion 51 of the light-transmitting portion 5 in parallel relation to the light-transmitting portion 5. The abutment member 6 is provided to be disposed outside the light distribution range L of light directed from the bulb 3 toward the light-transmitting portion 5. Namely, the light distribution range L means the distribution range of those of light rays from the bulb 3 which pass through the light-transmitting portion 5 to the exterior of the box-like body 2. That portion of the surface of the light-transmitting portion through which the light passes serves as an illumination surface.

The light distribution range L is suitably determined according to the specifications of the vehicle room lamp 1 and others, and for example in the case of illuminating a narrow range as in a map lamp, the light distribution range L is narrow such that both the abutment member and the upstanding portion are outside the light distribution range, while in the case of passing light also through the upstanding portion 51, the light distribution range L is wide. Thus, the light distribution range L can be determined in various ways.

The abutment member 6 includes an abutment portion 6a abutting against the push switch 4, an interconnecting portion 6b interconnecting the abutment portion 6a and the upstanding portion 51 of the light-transmitting portion 5, and a pair of reinforcing portions 6c and 6c. The abutment portion 6a has a semicircular cross-section, and its peripheral surface abuts against an abutment surface 4a of the push switch 4. The interconnecting portion 6b has a flat plate-shape, and is integrally connected at one end thereof to the upstanding portion 51, and the abutment portion 6a is formed at the other end thereof.

The pair of reinforcing portions 6c and 6c project upright respectively from opposite side edges of the interconnecting portion 6b in the pressing direction X, and are integrally connected at their one ends to the inner surface of the upstanding portion 51. The strength of the abutment member 6 is increased by the pair of reinforcing portions 6c and 6c so that the abutment member 6 will not be damaged, for example, upon pressing. The gap between the pair of reinforcing portions 6c and 6c, that is, the width of the interconnecting portion 6b, is larger than the outer diameter (width) of the push switch 4 so that the abutment member 6 will not prevent the switching operation of the push switch 4.

Next, the assembling of the vehicle room lamp 1 will be described. First, the bulb 3 is attached to each switch unit 22 in the box-like body 2, and then each light-transmitting portion 5 is movably mounted on the box-like body 2 to close the opening 20 in the box-like body 2, with the abutment portion 6a of the abutment member 6 held against the push switch 4.

When the vehicle room lamp 1 is thus assembled, the abutment member 6 is kept abutted against the push switch 4 in the OFF state by the above urging means. When the light-transmitting portion 5 is pressed in the pressing direction X by the passenger, the abutment member 6 is moved together with the light-transmitting portion 5 in the pressing direction X to operate the push switch 4 to switch the same from the OFF state into the ON state. Then, when this operation for pressing the light-transmitting portion 5 in the pressing direction X is finished, the light-transmitting portion 5 is returned by the urging force of the urging means to the position corresponding to the OFF state of the push switch 4.

Next, the illuminating operation of the vehicle room lamp 1 of the invention will be described. First, when the light-transmitting portion 5 is pressed in the pressing direction X to switch the push switch 4 into the ON state, the bulb 3 is turned on (or lighted) by electric power supplied from the switch unit 22. Those light rays from the bulb 3 which are directed toward the light distribution range L are all directed toward the light-transmitting portion 5, and pass through the light-transmitting portion 5 to the exterior of the box-like body 2 to illuminate the vehicle room. Those light rays directed toward the abutment member 6 are outside the light distribution range L, and therefore will not exert any influence upon the illumination by the light-transmitting portion 5.

As described above, in the vehicle room lamp 1 of the invention, the abutment member 6 is prevented from intercepting light which is to pass through the light-transmitting portion 5, and therefore a shadow of the abutment member 6 is prevented from appearing on the light-transmitting portion 5, and therefore the illumination surface of the light-transmitting portion 5 can become luminous uniformly over the entire area thereof. Therefore, there can be provided the vehicle room lamp 1 in which the box-like body 2 can be formed into a compact design without degrading the appearance, and a novel design of the room lamp can be achieved. And besides, the abutment member 6 can be provided on the reverse side of the light-transmitting portion 5, which contributes to a thin design of the light-transmitting portion 5, and also the degree of freedom of disposition of the push switch 4 can be increased.

Furthermore, the abutment member 6 is formed integrally on the upstanding portion 51 formed upright on the light-transmitting portion 5, and the abutment member 6 is positively prevented from intercepting light which is to pass through the light-transmitting portion 5. Therefore, the number of the component parts can be reduced.

Figure 5:
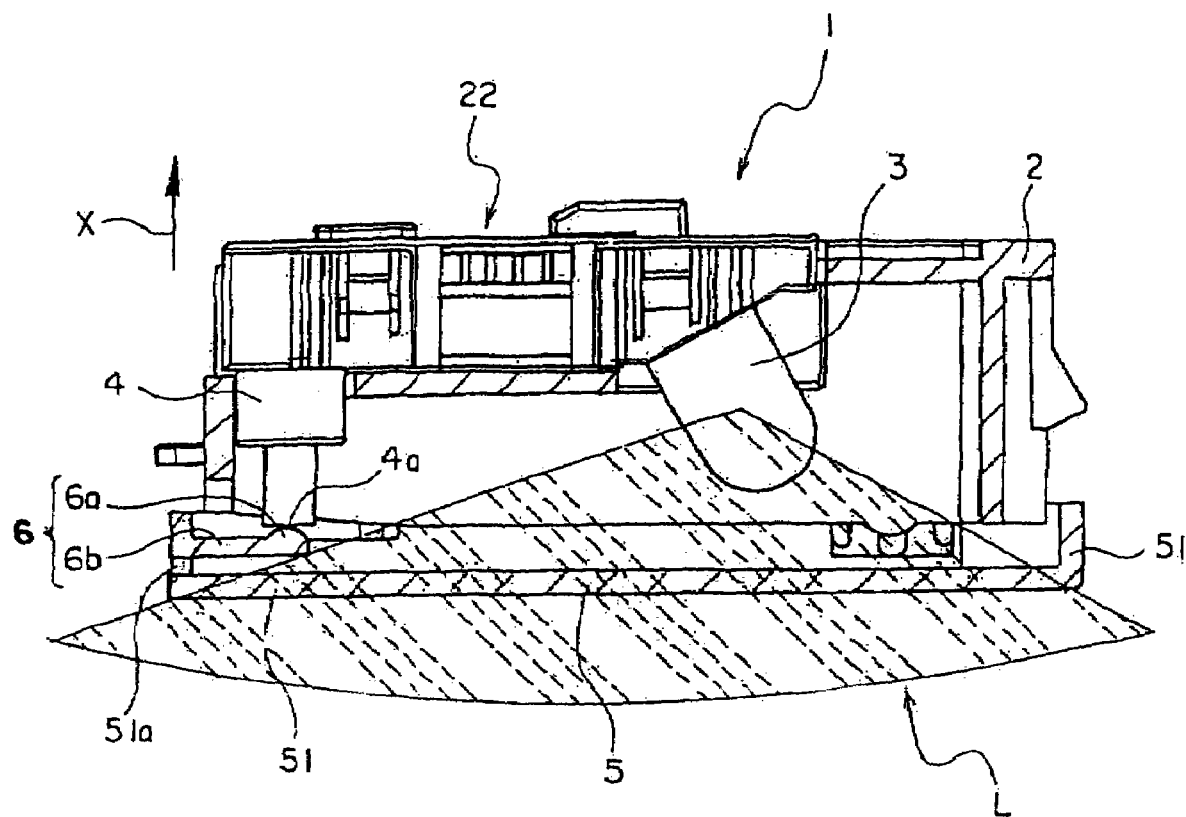
FIG. 5 is a cross-sectional view explanatory of a modified vehicle room lamp of the invention.
Figure 6:
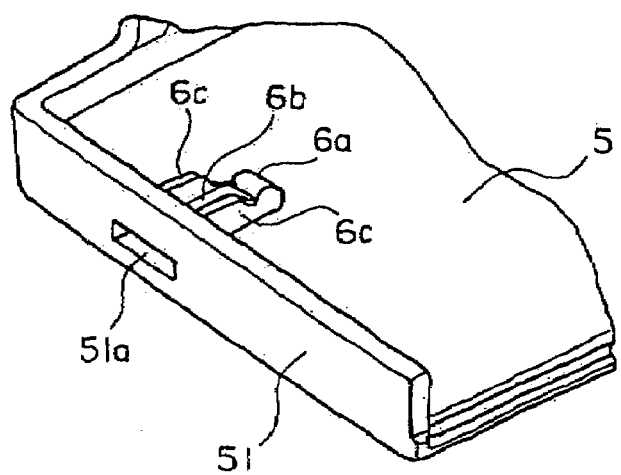
FIG. 6 a view of the modified vehicle room lamp explanatory of the relation between the light-transmitting portion and the abutment member.

In the above embodiment shown in FIGS. 1 to 4, a slide mold member for forming the abutment member 6 must be so arranged as to be disposed in the light-transmitting portion 5 and the upstanding portion 1. However, the abutment member 6 can be formed by anther method in which a hole 51a is formed through the upstanding portion 51 as shown in FIGS. 5 and 6, and the abutment member 6 is formed, using an external slide mold member through the hole 51a. Even when the abutment member 6 is formed in this manner, the abutment member 6 is prevented from intercepting light which is to pass through the light-transmitting portion 5, and therefore the illumination surface of the light-transmitting portion 5 can become luminous uniformly over the entire area thereof. Therefore, there can be provided the vehicle room lamp 1 in which the box-like body 2 can be formed into the compact design without degrading the appearance, and the novel design of the room lamp can be achieved.

In the above embodiment, although the abutment member 6 is formed integrally on the upstanding portion 51 of the light-transmitting portion 5, the invention is not limited to such a construction, and the abutment member 6 can be separate from the upstanding portion 51.

Figure 7:
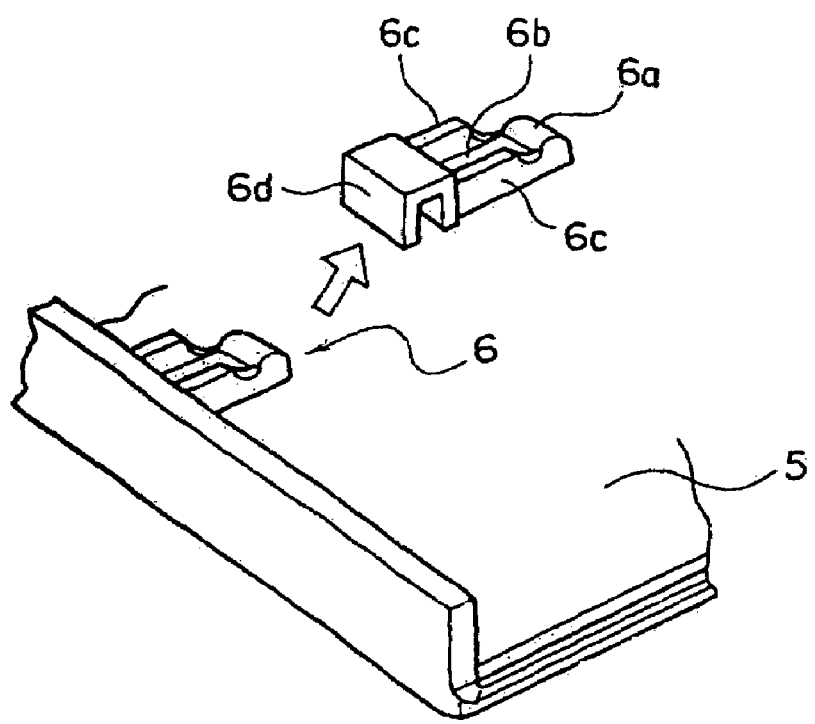
FIG. 7 is a view explanatory of a modified light-transmitting portion and a modified abutment member which are separate from each other.

For example, as shown in FIG. 7, an abutment member 6 and a light-transmitting portion 5 which are separate from each other are formed, and a fitting portion 6d is formed on the abutment portion 6. A fitting reception portion (not shown) is formed on the light-transmitting portion 5, and the fitting portion 6*d* is fitted to this fitting reception portion, thereby mounting the abutment member 6 on the light-transmitting portion 5. With this construction, also, the abutment member 6 separate from the light-transmitting portion 5 can be positively disposed outside the light distribution range L, and light in the light distribution range L can be positively passed through the light-transmitting portion 5. And besides, since the abutment member 6 is provided as a separate member, a material (such as an engineering plastics material, metal or others) which is not restricted by the light-transmitting portion 5 can be used for forming the abutment member 6, and therefore the degree of freedom for the strength, design, etc., can be enhanced.

What is claimed is:

1. A vehicle room lamp comprising:
   a box-like body;
   a light source received within said box-like body;
   a switch provided within said box-like body so as to control the turning-on and -off of said light source;
   a light-transmitting portion which is provided at said box-like body at an opening thereof so as to move toward and away from said switch, and allows light from said light source to pass therethrough to the exterior of said box-like body, said light-transmitting portion having an upstanding portion projecting in an upstanding manner generally toward said switch; and
   an abutment member attached to said upstanding portion and which is movable together with said light-transmitting portion, the abutment member operating said switch in accordance with the movement of said light-transmitting portion toward said switch, said abutment member extending inwardly from said upstanding portion,
   wherein said abutment member and said upstanding portion are disposed outside a light distribution range of light directed from said light source toward said light-transmitting portion, and
   wherein said abutment member extends from said upstanding portion substantially toward a center axis of the light transmitting portion.

2. A vehicle room lamp according to claim 1, wherein said abutment member is formed integrally on said upstanding portion.

3. A vehicle room lamp according to claim 1, wherein said abutment member is separate from said upstanding portion.

4. A vehicle room lamp according to claim 1, wherein said abutment member extends from an inner surface of said upstanding portion of said light transmitting portion.

5. A vehicle room lamp comprising:
   a box-like body;
   a light source received within said box-like body;
   a switch provided within said box-like body so as to control the turning-on and -off of said light source;
   a light-transmitting portion which is provided at said box-like body at an opening thereof so as to move toward and away from said switch, and allows light from said light source to pass therethrough to the exterior of said box-like body, said light-transmitting portion having an upstanding portion projecting in an upstanding manner generally toward said switch; and
   an abutment member attached to said upstanding portion and which is movable together with said light-transmitting portion, the abutment member operating said switch in accordance with the movement of said light-transmitting portion toward said switch, said abutment member extending inwardly from said upstanding portion,
   wherein said abutment member and said upstanding portion are disposed outside a light distribution range of light directed from said light source toward said light-transmitting portion,
   wherein said light transmitting portion has a lens plate portion from which said upstanding portion extends, and said abutment member projects from said upstanding portion in parallel relation to the lens plate portion in a position under the lens plate portion.

6. A vehicle room lamp according to claim 5, wherein said abutment member is formed integrally on said upstanding portion.

7. A vehicle room lamp according to claim 5, wherein said abutment member is separate from said upstanding portion.

8. A vehicle room lamp according to claim 5, wherein said abutment member extends from an inner surface of said upstanding portion of said light transmitting portion.

* * * * *